US012600648B2

(12) United States Patent
Garyfallos et al.

(10) Patent No.: US 12,600,648 B2
(45) Date of Patent: Apr. 14, 2026

(54) WATER TREATMENT APPARATUS AND METHOD FOR TREATMENT OF WATER

(71) Applicant: ABB Schweiz AG, Baden (CH)

(72) Inventors: Angelos Garyfallos, Niederrohrdorf (CH); Frank Kassubek, Rheinfelden (DE); Jan Carstensen, Waldshut-Tiengen (DE); Andreas Wetzel, Brugg (CH); Emmanouil Panousis, Baden (CH)

(73) Assignee: ABB Schweiz AG, Baden (CH)

( * ) Notice: Subject to any disclaimer, the term of this patent is extended or adjusted under 35 U.S.C. 154(b) by 945 days.

(21) Appl. No.: 17/299,876

(22) PCT Filed: Dec. 13, 2019

(86) PCT No.: PCT/EP2019/085153
§ 371 (c)(1),
(2) Date: Jun. 4, 2021

(87) PCT Pub. No.: WO2020/120763
PCT Pub. Date: Jun. 18, 2020

(65) Prior Publication Data
US 2022/0081326 A1 Mar. 17, 2022

(30) Foreign Application Priority Data

Dec. 14, 2018 (EP) ..................................... 18212656

(51) Int. Cl.
*C02F 1/46* (2023.01)
*C02F 1/78* (2023.01)
(Continued)

(52) U.S. Cl.
CPC .............. *C02F 1/4608* (2013.01); *C02F 1/78* (2013.01); *H05H 1/48* (2013.01);
(Continued)

(58) Field of Classification Search
CPC ............. H01J 37/3244; H01J 2237/335; H01J 37/32348; H01J 37/32449;
(Continued)

(56) References Cited

U.S. PATENT DOCUMENTS

| | | | | |
|---|---|---|---|---|
| 6,116,186 A | * | 9/2000 | Li | ..................... H01J 37/32522 204/298.37 |
| 2005/0172899 A1 | * | 8/2005 | Fukuda | .................. G02B 1/115 118/718 |

(Continued)

FOREIGN PATENT DOCUMENTS

| | | | |
|---|---|---|---|
| CN | 101983935 A | * | 3/2011 |
| CN | 102010040 A | * | 4/2011 |

(Continued)

OTHER PUBLICATIONS

Machine generated translation of CN-102173485-A (Year: 2011).*

(Continued)

*Primary Examiner* — In Suk C Bullock
*Assistant Examiner* — Bernadette Karen McGann
(74) *Attorney, Agent, or Firm* — Whitmyer IP Group LLC

(57) ABSTRACT

A ballast water treatment apparatus including a ballast water transport line configured to transport a ballast water main stream, a plasma generation device configured to generate an activated gas from a feed gas; and a mixing device. The plasma generation device includes a feed gas inlet for a feed gas, a first electrode and a second electrode, for activating the feed gas by an electric discharge between the first electrode and the second electrode thereby generating the activated gas, a cooling fluid passage for cooling the plasma generation device, the cooling fluid passage having a cooling fluid inlet and a cooling fluid outlet, the cooling fluid passage being fed with a cooling fluid, and a combining section being configured to combine the activated gas with (Continued)

the cooling fluid from the cooling fluid outlet to generate an activated fluid product. The mixing device is configured to mix the activated fluid product and the ballast water main stream.

19 Claims, 4 Drawing Sheets

(51) Int. Cl.
*C02F 103/00* (2006.01)
*H05H 1/48* (2006.01)

(52) U.S. Cl.
CPC .... *C02F 2103/008* (2013.01); *C02F 2303/04* (2013.01); *H05H 2240/20* (2013.01); *H05H 2245/20* (2021.05)

(58) Field of Classification Search
CPC ................. H01J 37/32009; H01J 37/32; H01J 37/32522; H01J 2237/022; H01J 37/32532; H05H 1/24; H05H 2245/20; H05H 2245/00; B01D 2259/818; C02F 1/4608; C02F 1/48; C02F 1/46; C02F 1/4604; C02F 1/4606; C02F 2303/04
See application file for complete search history.

(56) References Cited

U.S. PATENT DOCUMENTS

| | | | | |
|---|---|---|---|---|
| 2010/0193129 A1* | 8/2010 | Tabata | .............. | H01J 37/32348 |
| | | | | 156/345.35 |
| 2016/0074829 A1 | 3/2016 | Kitano et al. | | |
| 2017/0216469 A1 | 8/2017 | Krohmann et al. | | |
| 2018/0265388 A1* | 9/2018 | Fraser | ....................... | C02F 9/00 |

FOREIGN PATENT DOCUMENTS

| | | | | |
|---|---|---|---|---|
| CN | 102173485 A | * | 9/2011 | |
| CN | 102173485 B | | 9/2011 | |
| CN | 203833740 U | | 9/2014 | |
| CN | 106145213 A | | 11/2016 | |
| CN | 106977048 A | | 7/2017 | |
| JP | H09173804 A | * | 7/1997 | |
| KR | 20170114205 A | * | 10/2017 | |
| KR | 101851465 B1 | * | 6/2018 | |
| KR | 20180131200 A | | 12/2018 | |

OTHER PUBLICATIONS

Machine generated translation of KR 20170114205 A (Year: 2017).*
Machine generated translation of CN 102010040 A (Year: 2011).*
Machine generated translation of CN 101983935 A (Year: 2011).*
Machine generated translation of KR101851465B1 (Year: 2018).*
Machine generated translation of JP H09173804 A (Year: 1997).*
Skrzypek, K. and Grzywacz, R., 2017. The mixing hydrodynamics and efficiency of the Venturi jet mixer. Technical Transactions, 2017(Year 2017 (114)), pp. 95-106. (Year: 2017).*
Wang Guojian; The Modern Methods and Technology of Polymer Synthesis; pp. 144-145; Tongji University Press Postgraduate Textbook; July of 2013.
Chinese Office Action and Search Report; Application No. 2019800823508; Issued: Aug. 3, 2022; 21 Pages.
Chinese Office Action and Search Report; Application No. 2019800823508; Issued: Mar. 14, 2023; 20 Pages.
Zhitao, Zhang: et al.; "Treatment of Invasive Marine Species on Board by Using Micro-gap Discharge Plasma"; Plasma Science and Technology, vol. 7, No. 5; IOP Publishing Ltd.; Oct. 1, 2005; 6 Pages.
Extended European Search Report; Application No. 18212656.5; Completed: Apr. 15, 2019; Issued: Apr. 24, 2019; 7 Pages.
International Search Report and Written Opinion of the International Searching Authority; Application No. PCT/EP2019/085153; Completed: Jan. 24, 2020; Mailing Date: Feb. 3, 2020; 13 Pages.

* cited by examiner

WATER TREATMENT APPARATUS AND METHOD FOR TREATMENT OF WATER

TECHNICAL FIELD

The present invention relates to an apparatus and method for water treatment, e.g. for marine growth prevention. More particularly, the present invention relates to apparatuses and methods for marine growth prevention, e.g., for the depletion of ballast water components.

BACKGROUND

Recently there has been a rising need for treatment of water, especially of seawater. One example among others is the treatment of ballast water in ships. Ships use seawater for several purposes—e.g. as ballast, for cooling, for cleaning. In many cases, the seawater containing marine organisms, has to be treated before use or discharge to prevent these organisms to grow in unwanted places (either within the ship or the sea). This is especially true for ballast water (which we include in marine growth prevention here) where strict legal regulations have been imposed on the amount and type of organisms that can be discharged: For travelling in a partially loaded or unloaded state, a cargo ship is typically equipped with one or more ballast water tank. In a seagoing vessel, the ballast water tanks are filled with seawater (saline water), e.g., ballast water, at a first location which contributes to stabilization. The ship travels to a second location and discharges the ballast water.

Ballast water from the first location may contain biological species such as algae and oceanic plankton that are biologically invasive (i.e. introduced species) at the second location. Thus, it is legally required that ballast water is treated, or disinfected, before its discharge. A typical ballast water treatment process involves a filtration stage (a physical separation stage) and a disinfection stage. In the filtration stage, typically, solids having a particle size of >50 μm are removed. Examples for a filtration stage include backwashable mesh or disk filters, hydrocyclones or the like. Living organisms below these dimensions remain to be treated by the disinfection stage.

Most commonly, the disinfection stage involves an ultraviolet (UV) treatment method or an electro-chlorination method. Regulations in some countries require that organisms released in a ballast water discharging process are actually dead; however, UV treatment is known to leave some organisms in a living, but non-viable stage. As the UV treatment mainly damages the DNA of organisms, it can render them non-reproductive. However, to actually kill the organisms, very high doses of UV are necessary, which leads to large energy consumption and reduces the treatment capacity of a UV-based disinfection stage. Some UV-based disinfection stage treatment methods involve a first disinfection process during charging the ballast water into the ballast water tanks, and a second disinfection process during the ballast water discharge, which makes this approach time consuming and costly.

Electro-chlorination is an electrolytic process that needs a branch path, or side-stream path, branching off from the main ballast water stream. Electrolysis in saline water generates free chlorine that is an active oxidative species. The electrolyzed branched-off water is injected into the main ballast water, wherein the free chlorine and/or chlorine compounds generated therefrom disrupt the outer membrane of the living organisms inside the ballast water stream. However, free chlorine as well as some chlorine compounds are known to have long lifetime; thus, such substances have to be removed prior to discharging the treated water into the sea. Also, electrolysis is non-functional in brackish water or fresh water. Also, the level of salinity of the treated water directly affects the chlorine production. Moreover, electrolysis involves a production of hydrogen as a by-product, which may lead to safety risks.

Disinfection systems are also dependent on several other influencing factors that influence efficiency, output and other system-related parameters. Such influencing factors include process-induced factors e.g. thermal generation, pressure alterations and the like.

In light of the above, there is a need for an improved treatment approach of water, especially of seawater, that also considers influencing factors.

SUMMARY

According to an aspect, a water treatment apparatus is provided. The water treatment apparatus includes a water transport line configured to transport a water main stream, a plasma generation device configured to generate an activated gas from a feed gas and a mixing device. The plasma generation device includes a feed gas inlet for a feed gas, a first electrode and a second electrode, for activating the feed gas by an electric discharge between the first electrode and the second electrode thereby generating the activated gas, a cooling fluid passage for cooling the plasma generation device, the cooling fluid passage having a cooling fluid inlet and a cooling fluid outlet and the cooling fluid passage being fed with a cooling fluid. The plasma generation device includes a combining section being configured to combine the activated gas with the cooling fluid from the cooling fluid outlet to generate an activated fluid product. The mixing device is configured to mix the activated fluid product and the water main stream.

According to an aspect, a method for treatment of water is provided. The method includes transporting a water main stream through a water transport line, generating an activated gas from a feed gas with a plasma generation device, the plasma generation device comprising a feed gas inlet, a first electrode and a second electrode, for activating the feed gas by an electric discharge between the first electrode and the second electrode thereby generating the activated gas, cooling the plasma generation device by feeding a cooling fluid passage with a cooling fluid, the cooling fluid passage having a cooling fluid inlet and a cooling fluid outlet, combining the activated gas with the cooling fluid from the cooling fluid outlet to generate an activated fluid product; and mixing the activated fluid product and the water main stream.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

Figure 1:
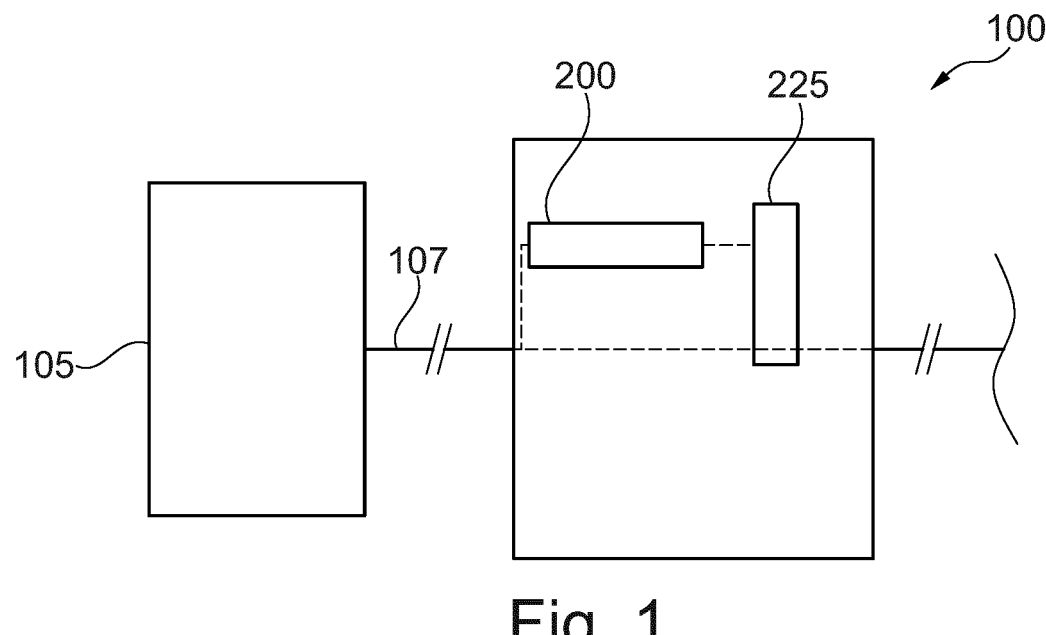
FIG. 1 shows a schematic view of a water treatment apparatus according to embodiments described herein.

In water treatment, several disinfection processes may be provided. For example, the so-called dielectric barrier discharge (DBD) system may be used for such disinfection processes. The DBD system may be dependent on e.g. non-thermal plasma generation by the use of a plasma generation device. However, such disinfection systems may be impacted by different factors. One factor is the temperature provided within the plasma generation device. Heat generated by the plasma has to be removed. Typically, as a rule of thumb, the higher the temperature the lower the efficiency of the active species generation by the plasma generation device. It is thus beneficial to regulate the temperature in the ballast water treatment apparatus and to actively cool the system. Furthermore, it is beneficial to enhance and improve mixing of the active species and the ballast water. In the following, embodiments of the water treatment system are described. The description is given for a ballast water treatment, but it is equally applicable to any other water treatment system for marine growth prevention, and in particular for any seawater treatment system.

According to embodiments described herein, a water treatment apparatus is provided. The water treatment apparatus includes a water transport line configured to transport a water main stream, a plasma generation device configured to generate an activated gas from a feed gas and a mixing device. The plasma generation device includes a feed gas inlet for a feed gas, a first electrode and a second electrode, for activating the feed gas by an electric discharge between the first electrode and the second electrode thereby generating the activated gas. The plasma generation device further includes a cooling fluid passage for cooling the plasma generation device, the cooling fluid passage having a cooling fluid inlet and a cooling fluid outlet, the cooling fluid passage being fed with a cooling fluid. The plasma generation device further includes a combining section being configured to combine the activated gas with the cooling fluid from the cooling fluid outlet to generate an activated fluid product. The mixing device is configured to mix the activated fluid product and the water main stream.

According to embodiments described herein, a water treatment system for marine growth prevention is provided. For instance, the water treatment system according to embodiments described herein, may be a system to be used in ships, more particularly in e.g. cargo ships for the depletion of water-related organisms and other substances as well as disinfection. According to embodiments described herein, the water to be treated can be seawater, saline water, fresh water, or the like, and can in particular be ballast water. The apparatus is, in particular, adapted for marine growth prevention treatment of the water. In the following the treatment of ballast water is described in more detail by means of example, but it is understood that these embodiments can also be used for treating other water.

FIG. 1 shows a schematic view of a ballast water treatment apparatus illustrating general embodiments (aspects) of the present invention, as described in the following. The ballast water treatment apparatus may include a ballast water transport line 107 configured to transport a ballast water main stream. The ballast water main stream may be provided from a ballast water source 105 e.g. from saline water, fresh water, a water reservoir etc. for example, the ballast water treatment apparatus may be arranged in ships, in particular cargo ships, more particularly in cruise ships, ferries and the like. The ballast water main stream may include the ballast water to be treated.

According to embodiments, the ballast water may be pumped into the ballast water treatment apparatus. A pumping device may be in fluid connection with the ballast water transport line 107. The ballast water may be pumped through the ballast water treatment apparatus. The ballast water may be filtered at a filtering module (not shown). The filtering module may be configured to remove spatially bigger components of the ballast water like e.g. plastic, wood, mussels and the like. The filtering module may include one or more filters or filter cassettes with a defined pore size. For example, the pore size may be big enough to allow for small ballast water components to pass the filter like e.g. water-related organisms but may be small enough to retain bigger components. The pore size may e.g. have a cutoff for components >50 μm, i.e. those components are filtered out by the membrane.

Treatment of the ballast water is beneficial, because an adequate disinfection of the ballast water is required before it is released back to the ballast water source. For example, microorganisms contained in the ballast water need to be effectively depleted.

According to embodiments described herein, the ballast water is transported towards a plasma generation device. The ballast water main stream may be transported adjacent to the plasma generation device 200. The plasma generation device may be coaxially arranged in the ballast water treatment apparatus. The plasma generation device in general, may be configured to provide for disinfection of the ballast water. In particular, the plasma generation device may be configured to provide an activated gas for the disinfection of the ballast water. The activated gas may include activated species. The terms "active species" or "activated species" as used herein may be understood as reactive substances like e.g. chemical substances, particularly bare atoms, excited molecules, radicals, electrons, ions and the like. In embodiments, the plasma generation device may be cooled. Accordingly, a cooling fluid may be provided to the plasma generation device.

According to embodiments described herein, the ballast water main stream or the ballast water transported may be treated. The terms "treatment" or "treating" as used herein may be understood as several processes for disinfection of the ballast water. This may include the depletion of organisms, in particular of microorganisms in the ballast water including bacteria, algae and other ballast water-related organisms. For example, the ballast water may be treated with a dielectric barrier discharge (DBD) system or a corona discharge system.

According to an aspect, a plasma may be generated between a first electrode and a second electrode by an electric discharge, in particular a non-thermal plasma. The plasma may generate active species of a feed gas to generate an activated gas which may be used for disinfection of ballast water. The electric discharge may include a non-thermal discharge.

In embodiments, the non-thermal discharge is a dielectric barrier discharge (DBD), a corona type discharge, a glow discharge, or an arc-less discharge fed by a pulsed energy source. Non-thermal, as used herein, involves generally a discharge in which no arcing occurs. In the exemplary case of a dielectric barrier discharge, a dielectric for producing the dielectric barrier discharge may be, but is not limited to, silica glass, quartz glass, alumina, and vitreous enamel. In embodiments, at least one electrode of the plasma generation device may be at least partially covered with the dielectric.

A non-thermal discharge, such as a streamer-type discharge, is different from an arc-type discharge and different from a corona-type discharge. A dielectric barrier discharge occurs as a fast-ionizing front mechanism (the 'streamer' regime): An ionization is stimulated by an avalanche of electrons which leads to a distribution of carrier charges by the avalanche. A streamer head having a high charge moves forward inside the generated field. The field is shielded by the streamer head (i.e. the most of the field drops off in the streamer head region) and the streamer moves in the overall field. At the streamer head, the described electron acceleration processes and ionization is taking place. The plasma is generated as a non-equilibrium (non-LTE) plasma.

In other words: the electrical energy of the discharge is primarily transferred to electrons that are elevated in temperature (e.g. to temperatures of more than $10^3$ K), whereas the heavier gas components (atoms, molecules, ions) stay at temperatures close to the ambient temperature of e. g. <500 K. The electrons at the elevated temperature inelastically collide with the heavier gas components. In this collision and subsequent chemical reactions, active oxidants are produced. An active oxidant may, for example, include ozone, but also excited molecules, atoms, ions, and radicals.

As a non-limiting example, a power supply may provide a (pulsed) voltage of approximately 10 kV to the plasma generation device. A typical pressure of the ballast water inside the ballast water transport line amounts to approximately 100-1000 kPa. In embodiments, an absolute value of an amplitude of a voltage applied to obtain the non-thermal discharge is between 1 kV and 30 kV, optionally between 3 kV and 15 kV. Alternatively or additionally, a voltage applied to obtain the non-thermal discharge is a pulsed voltage, wherein the pulsed voltage has a pulse frequency between 0.5 kHz and 200 kHz, optionally between 10 kHz and 100 kHz and typically about 10 kHz. Alternatively or additionally, when the voltage applied to obtain the non-thermal discharge is a pulsed voltage, such as a unipolar or bipolar pulsed voltage, the pulsed voltage has a pulse duration between 0.1 μs and 5 μs, optionally between 1 μs and 3 μs and preferably about 1 μs.

In embodiments, the ballast water treatment apparatus may include a voltage generator supplying the plasma generation device. The voltage generator may have a voltage parameter that is adjustable. A voltage parameter may include an absolute value of the output voltage, a pulse frequency of the output voltage, and/or a pulse duration of the output voltage. By an independent adjustment, a spatially distributed gas concentration of active oxidants, such as ozone, can be determined, which may help to optimize the disinfection process.

Generally, the plasma generation device can have a cylindrical coaxial geometry, a plate-to-plate geometry or other possible geometries. According to embodiments, the plasma generation device may include a feed gas inlet for a feed gas, a first electrode, a second electrode and a dielectric therebetween. The first electrode and the second electrode may define a discharge area therebetween. The feed gas may be guided through the discharge area between the first electrode and the second electrode. The feed gas may be activated in the discharge area, thus generating an activated gas.

According to embodiments, an activated gas may be generated in the plasma generation device. In particular, activated or active species may be generated in the discharge area of the plasma generation device. The activated species may be activated gas species. The activated species may include excited molecules, radicals, electrons, ions and the like and combinations thereof. For example, ozone radicals may be generated. Additionally or alternatively, the activated species or activated gas species may include activated chemical species. The activated species, the activated gas species and/or the activated chemical species may participate in ballast water treatment. The plasma generation device may include an activated gas outlet for the activated gas to exit the discharge area.

According to embodiments, the plasma generation device includes a cooling fluid passage for cooling the plasma generation device. The cooling fluid passage is adapted for cooling the plasma generation device (i.e., for cooling at least a portion of the plasma generation device). For this purpose, a cooling fluid has a direct or close thermal contact with at least a portion of the plasma generation device, such as the first electrode, the second electrode, and/or a dielectric arranged between the first and second electrodes.

The cooling fluid passage may be fed with a cooling fluid. The cooling fluid passage may have a cooling fluid inlet and a cooling fluid outlet. The cooling fluid passage may be provided between the cooling fluid inlet and the cooling fluid outlet. The cooling fluid passage may include one or more cooling fluid channels. A cooling fluid may enter the cooling fluid passage at the cooling fluid inlet, may flow through the cooling fluid passage to allow for a heat transfer and may exit the cooling fluid passage at the cooling fluid outlet. In particular, the cooling fluid may be provided through the one or more cooling fluid channels. At least one of the first electrode, the second electrode and/or the dielectric may include the cooling fluid passage.

In operation of the plasma generation device and according to embodiments, the cooling fluid may be provided at a temperature that is lower compared to the temperature generated by plasma generation device e.g. during electric discharge. This may allow for a heat exchange at the cooling fluid passage between the plasma generation device including a higher temperature and the cooling fluid including a lower temperature to cool the plasma generation device as well as related components like the first and the second electrode, the dielectric and/or the plasma, the feed gas and/or the activated gas. Upon heat exchange, the cooling fluid may be transported away from the plasma generation device and exit the plasma generation device. When heated, the cooling fluid may undergo a phase change (so-called two-phase cooling).

According to an aspect, cooling of the plasma generation device, i.e. cooling of the first and second electrodes and/or the dielectric may lead to cooling of at least one of the generated plasma, the feed gas and the activated gas. Thus, at least partly temperature-related degradation or inactivation of the active species may be avoided. The term "cooling" as used herein may not only be understood as cooling in comparison to an ambient temperature but also as keeping a temperature of the plasma generation device and its components not too high. In other words, the term "cooling" may also be understood as down regulating of a temperature.

For example, cooling may be regarded as removing the heat generated by the plasma generation device e.g. during electric discharge.

According to embodiments, the plasma generation device may include a combining section being configured to combine the activated gas with the cooling fluid from the cooling fluid outlet to generate an activated fluid product. The combining section may be understood as an area where the activated gas outlet and the cooling fluid outlet may end in. Accordingly, the activated gas and the cooling fluid may be brought into contact with each other which allows for mixing of the activated gas and the cooling fluid. In particular, this may allow for the activated species to be mixed with the cooling fluid e.g. this may allow for diffusion of the activated species and cooling fluid molecules. The formation of the activated fluid product is beneficial to protect the activated gas by direct dissolving of the active species in the cooling fluid.

An "activated fluid product" as used herein may be understood as the activated gas in combination with the cooling fluid. This may thus include the active species e.g. the activated gas species generated, being provided in or mixed with the cooling fluid. Since radicals can be easily degraded it is beneficial to generate an activated fluid product for extending or prolonging the lifetime of the active species.

According to embodiments, the activated gas outlet, the cooling fluid outlet and/or the combining section may be positioned in proximity of the ballast water stream which shall be disinfected during the ballast water transportation process, the proximity fulfilling the conditions disclosed herein. This may help to provide a suitable density of active oxidants to interact with the water stream, which then leads to an efficient oxidative disinfection.

According to embodiments, the activated gas may be combined with the cooling fluid. For example, the cooling fluid may be a liquid. The liquid may take up the activated gas molecules or activated species. By combining the cooling fluid with the activated gas, the activated fluid product may be generated. The activated fluid product may be provided to the ballast water main stream for disinfection purposes. The mixture of the cooling fluid and the activated gas may be provided to the ballast water main stream by the use of a mixing device 225.

Advantageously, combining the activated gas and the cooling fluid may result in a prolonged lifetime of the active species of the activated gas. The active species may dissolve in the cooling fluid. Thus, the active species may be more stable and remain reactive for a longer time compared to active species not dissolved in a (cooling) fluid. This is particularly beneficial when the cooling fluid is a liquid. Further, dissolved active species may react with the cooling liquid to form new active species in the liquid phase.

According to embodiments that can be combined with any embodiment described herein, a mixing device 225 may be provided. The mixing device 225 may be configured to mix the activated fluid product i.e. the combination of the cooling fluid and the activated gas and the ballast water main stream. The mixing device may be selected from one of the groups consisting of a T-junction, general purpose mixers like e.g. static mixers, a Venturi mixer, a pumping device, an ejector, a cyclone or combinations thereof. For example, the mixing device may be used to unite the activated fluid with the ballast stream.

Advantageously, such mixing device may allow for the creation of conditions that facilitate joining of two streams with different flow properties like e.g. flow velocity and pressure. For example, the pressure level of plasma generation and the pressure level of the ballast water main stream are decoupled from each other.

For example, the plasma generation device includes low pressure conditions to allow for a proper generation of active species. Accordingly, the generation of active species may be dependent from the pressure conditions in the plasma generation device. The ballast water transport line may include high pressure conditions. For bringing together the ballast water main stream and the active species for disinfection of the ballast water while ensuring proper formation of active species, the pressure difference needs to be overcome. Thus, it is beneficial to provide the active species in a fluid, particularly a liquid, and mix the cooling fluid and the ballast water main stream in a mixing device. Accordingly, mixing of the activated fluid product and the ballast water main stream is facilitated and enhanced by the mixing device 225.

According to embodiments, multiple plasma generation devices may be arranged in the ballast water treatment apparatus. The multiple plasma generation devices may be regulated independently from each other. For example, voltage intensity, voltage pulsing etc. may be regulated independently for each plasma generation device.

According to embodiments, a controller may be provided. The controller may be configured to regulate various settings of the ballast water treatment apparatus. For example, the controller may regulate the flow of the cooling fluid and/or the feed gas and/or the activated gas. Furthermore, the controller may be configured to regulate a pressure level of the cooling fluid and/or the feed gas, in particular the controller may be configured to regulate the pressure level at a cooling fluid inlet and/or a feed gas inlet. The person skilled in the art may understand that the controller may regulate further parameters related to the control of the ballast water treatment apparatus.

As a non-limiting example, a feed gas and a cooling fluid may be fed to the plasma generation device. The feed gas may enter the plasma generation device through the feed gas inlet and may be flown through the discharge area between the first electrode and the second electrode of the plasma generation device. The cooling fluid may be provided through the cooling fluid passage to cool the plasma generation device. At the discharge area, the feed gas may be activated by an electric discharge between the first electrode and the second electrode. Thus, an activated gas may be generated. In other words: activated species may be generated. The activated gas may flow through the discharge area and exit the discharge area through the activated gas outlet. The activated gas may be combined with the cooling fluid at the combining section to generate an activated fluid product. The activated fluid product may be mixed with the ballast water main stream by the mixing device.

Advantageously, this well controllable process does not depend on any uncontrollable properties of the ballast water. The mixing of the activated fluid product with the ballast water main stream is easier due to the fact that both components may be provided in a similar aggregate state. When using a pumping device for mixing or joining the activated fluid product and the ballast water main stream, a pressure drop in the main ballast water stream may be prevented. Further advantageously, the flow pressure can be adjusted e.g. to cope with the changings of velocity and pressure of the flow or stream in the ballast water transport line.

According to embodiments described herein, a ballast water treatment system may be provided. The ballast water treatment system may include the ballast water treatment apparatus and a storage tank. The ballast water may be stored in the storage tank e.g. after treatment. The ballast water may be transported to the ballast water tank through the ballast water transport line. The ballast water may be transported from the ballast water source to the tank. After storage, the ballast water may be transported back to the ballast water source e.g. through a second the ballast transport line.

Figure 2:
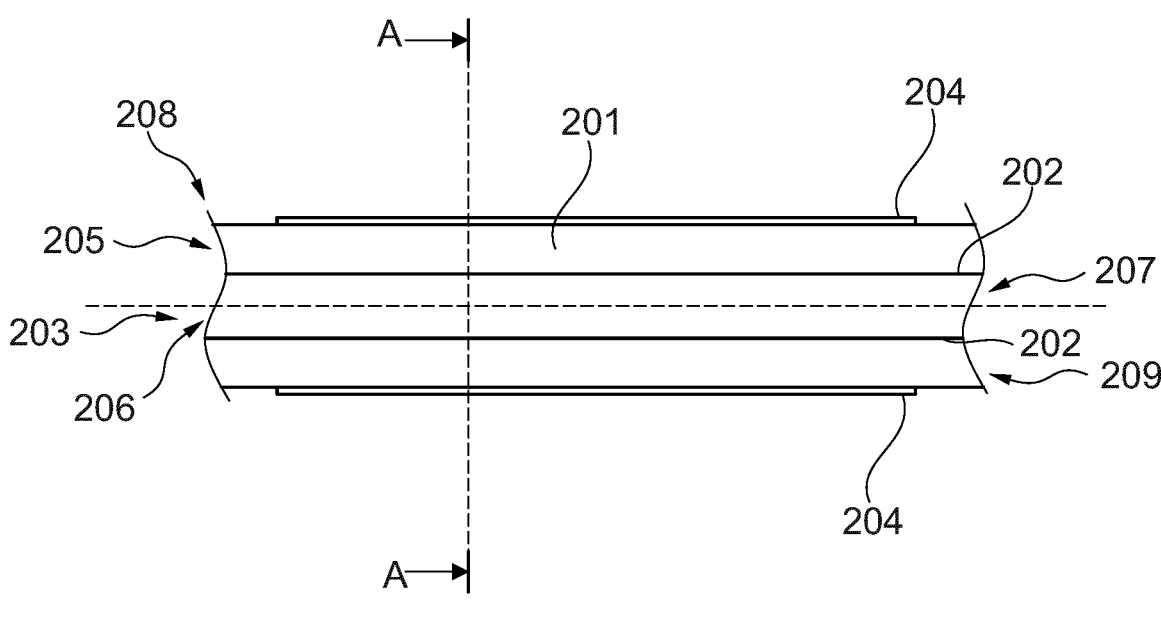
FIG. 2 shows a schematic view of a plasma generation device according to embodiments described herein.

FIG. 2 shows a schematic view of a plasma generation device according to embodiments described herein. The plasma generation device 200, as exemplarily shown in FIG. 2, may include a coaxial configuration. The plasma generation device may include a spatial extension in a longitudinal direction.

According to embodiments, the plasma generation device may include a hollow body 208 including a first electrode 202 and a second electrode 204. The first electrode and the second electrode may provide a discharge area 201. The discharge area may include a dielectric. The dielectric may be located between the first electrode and the second electrode. The discharge area may be configured to be fed with a feed gas.

According to embodiments, the plasma generation device 200 may include a coaxial arrangement. The components of the coaxial arrangement may include tubes of different and/or similar materials. For example, the first electrode and the second electrode may be made from metal. The dielectric may be made from a material suitable for dielectric discharge systems. The tubes may be held by a holding arrangement located at at least one entry or exit side of the coaxial plasma generation device.

The plasma generation device may include a feed gas inlet 205 and an activated gas outlet 209. The discharge area may be provided between the feed gas inlet and the activated gas outlet. The first electrode 202 and/or the second electrode may be on high voltage potential.

According to embodiments, the second electrode 204 may be arranged at an outer surface of the hollow body. The second electrode may be an external grounded electrode. The second electrode may be a laminar electrode. The second electrode may be coated to the hollow body. For example, the hollow body may be made from ceramic. The second electrode may include a dielectric and the first electrode may be free from a dielectric or vice versa. In other words: the dielectric may be arranged in contact with a surface of the second electrode 204 and the first electrode 202 may be free from the dielectric or vice versa.

According to embodiments, the plasma generation device may include a hollow body 208. Within the hollow body, an inner electrode, e.g. the first electrode 202, may be arranged. The inner electrode may include a cooling fluid passage 206. The cooling fluid passage may be arranged within the inner electrode e.g. the first electrode 202. The cooling fluid passage of the inner electrode may be fed with a cooling fluid. The inner electrode may be free from a dielectric. In other words, the inner electrode may not be covered with a dielectric. The hollow body may include an external electrode e.g. the second electrode 204. The external electrode may be arranged at an outer wall of the hollow body 208. The external electrode may include a dielectric. In other words, the dielectric may be arranged at the external electrode. Between the inner and the external electrode, a discharge area 201 and the dielectric may be provided.

The hollow body 208 may include the discharge area 201 between the first electrode and the second electrode 204. The plasma generation device 200 may include a feed gas inlet 205 and an activated gas outlet 209. The discharge area 201 may be arranged between the feed gas inlet 205 and the activated gas outlet 209. A feed gas may be provided through the discharge area 201 to generate an activated gas. The feed gas may include oxygen and/or nitrogen. The plasma generation device may be configured to generate a feed gas plasma, particularly a non-thermal feed gas plasma, more particularly a feed gas plasma by a non-thermal discharge in order to provide an activated gas.

According to embodiments described herein, the plasma generation device may include a cooling fluid inlet 203 and a cooling fluid outlet 207 and a cooling fluid passage there between. For example, the cooling fluid inlet, the cooling fluid outlet and the cooling fluid passage may be provided at the first electrode 202. The first electrode may include the cooling fluid passage. The cooling fluid passage within the first electrode may be configured to be fed with a cooling fluid. The cooling fluid may be provided at the cooling fluid inlet, may enter the first electrode and may exit the first electrode at the cooling fluid outlet. The cooling fluid may be configured to cool the plasma generation device. In particular, the cooling fluid may be configured to cool the first electrode. The cooling fluid may be a liquid, in particular, the cooling fluid may be a water-based liquid. According to embodiments, the cooling fluid may include a mixture of water and an anti-freezing compound e.g. glycol.

In embodiments, a cross sectional distance, e.g. a radial cross-sectional diameter, of the discharge area 201 of the plasma generation device may have a value between 0.5 mm and 8 mm, optionally between 0.5 mm and 5 mm and particularly approximately 1 mm. In other words: A radial gaseous gap is of the order of between 0.5 mm and 8 mm, preferably approximately 1 mm. This may help to achieve an advantageous critical voltage, or threshold voltage, for the onset of the plasma in the non-thermal discharge.

According to embodiments described herein, the cooling fluid may be combined with the activated gas. In other words: the cooling fluid may be combined with the activated species. The mixture may then be mixed with the ballast water main stream. The cooling fluid may be guided through the cooling fluid passage 206 of the first electrode 202 and may be combined with the activated gas (behind the first electrode) to generate an activated fluid product. The cooling fluid may include a temperature in the range of −20° C. to 50° C., particularly in the range of 0° C. to 50° C.

According to embodiments described herein, the cooling fluid may be configured to cool the plasma generation device 200. The cooling fluid may be provided through the cooling fluid passage provided by the first electrode. The cooling fluid may for example be pushed through the cooling fluid passage. By flowing through the cooling fluid passage, the cooling fluid may take up heat generated at the first electrode and may transport the heat away from the first electrode. Consequently, a heat exchange between the first electrode and the cooling fluid may occur. Advantageously, the plasma generation device, more particularly the first electrode, and thus the gas provided the plasma generation device may be cooled. According to embodiments, the cooling fluid may be provided at the plasma generation device 200. Several other configurations are described with respect to FIGS. 3A and 3B.

For example, a coaxial electrode may be provided for the use of the production of a non-thermal plasma. An axial gas flow through the discharge region may transport the excited molecules, created radicals and other active species along the electrode. The discharge activity in the discharge area may lead to an increase in temperature at the electrode close to and above 60° C., which in turn may lead to a significant reduction of active species. Advantageously, cooling of the electrode may prevent this effect, leading to more stable active species and an increased lifetime.

For example, the electrode may be cooled by a liquid medium e.g. de-ionized water that is flowing through the cooling fluid passage of the first electrode. In an experimental geometry it has been shown that a flow of water at 100 ml/min compared to the feed gas flow of 4.5 slm led to an overall temperature of the plasma generation device close to 60° C.

As a non-limiting example, it has been experimentally proven by the present inventors that a cooling effect including mixing the activated fluid product with the ballast water in a Venturi mixer has led to high radical (e.g. ozone) concentrations in the treated liquid i.e. the ballast water.

As a further non-limiting example, a stream of liquid may be used to cool the electrode, typically the one that comes in direct contact with the feed gas and/or the activated gas, i.e. typically the first electrode, typically not being covered with a dielectric, in order to keep the temperature of the electrode low. Temperature effects affecting the active species may start approximately around 60° C. A coaxial arrangement with the second electrode coupled to the dielectric and being arranged external of the hollow body, may be used. The first electrode may be free from the dielectric and may be arranged within the hollow body, the liquid may flow inside the inner electrode. In the space between the first and the second electrode, gas may flow at the presence of the generated plasma, and radicals may be produced. At the exit of the plasma generation device, the plasma activated gas may be mixed with the cooling liquid to form an activated fluid product. The activated fluid product may then be pushed into the main stream of ballast water for disinfection.

Figure 3A:
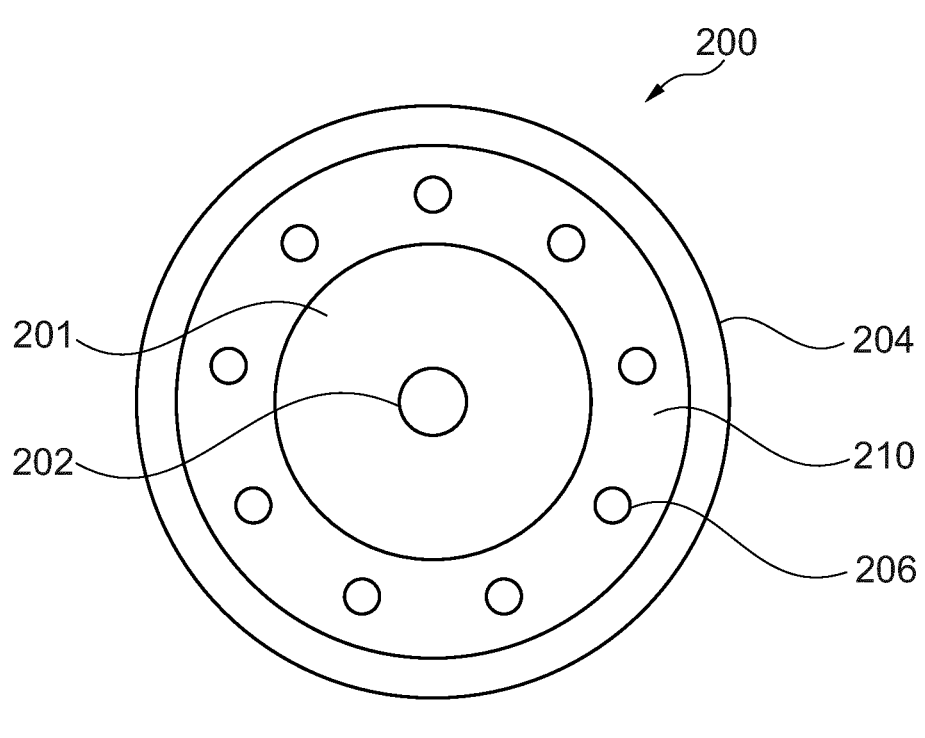
FIG. 3A shows a schematic view of a cross-section of a plasma generation device according to embodiments described herein.
Figure 3B:
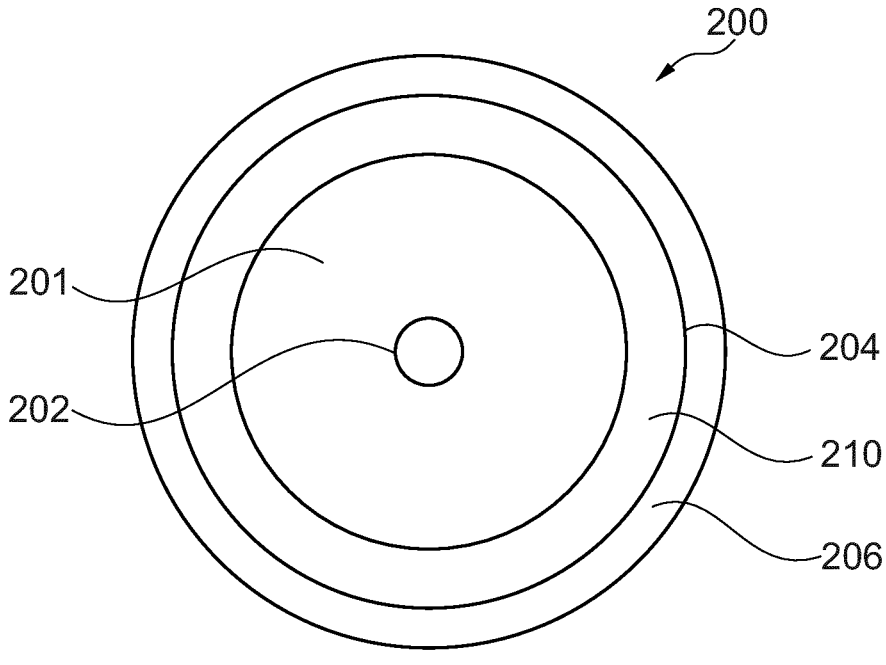
FIG. 3B shows a schematic view of a cross-section of a plasma generation device according to embodiments described herein.

FIGS. 3A and 3B show schematic views of a cross section of a plasma generation device according to embodiments described herein. In particular, FIGS. 3A and 3B relate to the fact that the arrangement of the components of the plasma generation device may vary. According to embodiments, the cooling fluid may be guided through the cooling fluid passage 206 of the first electrode 202 and/or the cooling fluid may be guided through the dielectric 210 and/or the cooling fluid may be provided at the second electrode 204.

As exemplarily shown in FIGS. 3A and 3B, the plasma generation device 200 may include a first electrode 202, a second electrode 204 and a discharge area 201 between the first electrode and the second electrode. The discharge area 201 may include a dielectric 210. The arrangement of the previously mentioned components may not be limited to the depiction of FIG. 3A.

According to embodiments that can be combined with any embodiment described herein, the dielectric 210 may include at least one cooling fluid passage 206. A cooling fluid as described with respect to FIG. 2 may be guided through the at least one cooling fluid passage 206. The at least one cooling fluid passage may include one or more cooling channels. Alternatively, the at least one cooling fluid passage 206 may be one or more bores in the material. The feed gas may be provided to the discharge area to generate activated species as described according to embodiments herein. The at least one cooling fluid passage 206 may be arranged in parallel to an axis of symmetry of the plasma generation device or may be arranged in a helix-conformation.

According to embodiments that can be combined with any embodiment described herein and as exemplarily shown in FIG. 3A, the dielectric 210 may be arranged at the second electrode 204. According to further embodiments, the dielectric 210 may be arranged at the first electrode 202.

Advantageously, cooling of the dielectric may lead to a cooled plasma generation device. For example, the temperature of the plasma generation device i.e. of the feed gas and/or activated gas may be kept below 150° C., in particular below 50° C. Advantageously, thermal effects on the feed gas and/or the activated gas may be prevented. Thus, stability and lifetime of the active species may be prolonged.

According to embodiments and as exemplarily shown with respect to FIG. 3B, the cooling fluid may be provided in at least one cooling fluid passage 206 arranged around the second electrode 204. For example, a tube may be arranged around the second electrode to be fed with the cooling fluid. The tube may e.g. be made from a polymeric material. According to embodiments, the second electrode 204 may be a hollow electrode. Thus, the second electrode may include the cooling fluid passage 206 and may be provided with the cooling fluid. In other words: the cooling fluid may be fed through the cooling fluid passage of the second electrode. For example, the plasma generation device may include at least one cooling fluid passage provided with at least one selected from the group consisting of the dielectric, the first electrode and/or the second electrode.

Advantageously, when the cooling fluid is provided at the second electrode, heat transport from the plasma generation device to an outer space surrounding the plasma generation device may be reduced or prevented. As such, it is possible to maintain the temperature of the system at a constant low level.

Figure 4A:
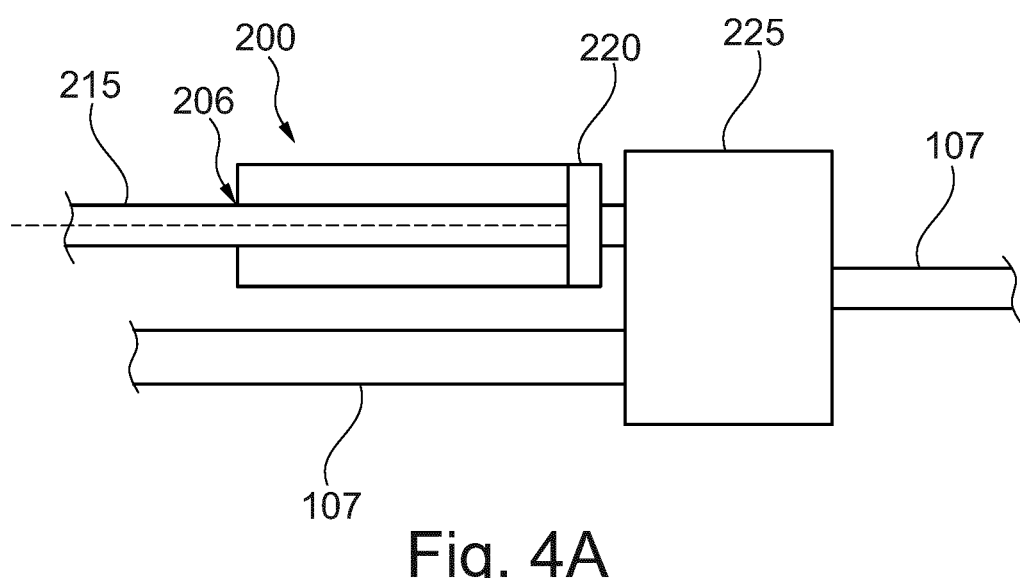
FIG. 4A shows a schematic view of an arrangement of a water treatment apparatus according to embodiments described herein.
Figure 4B:
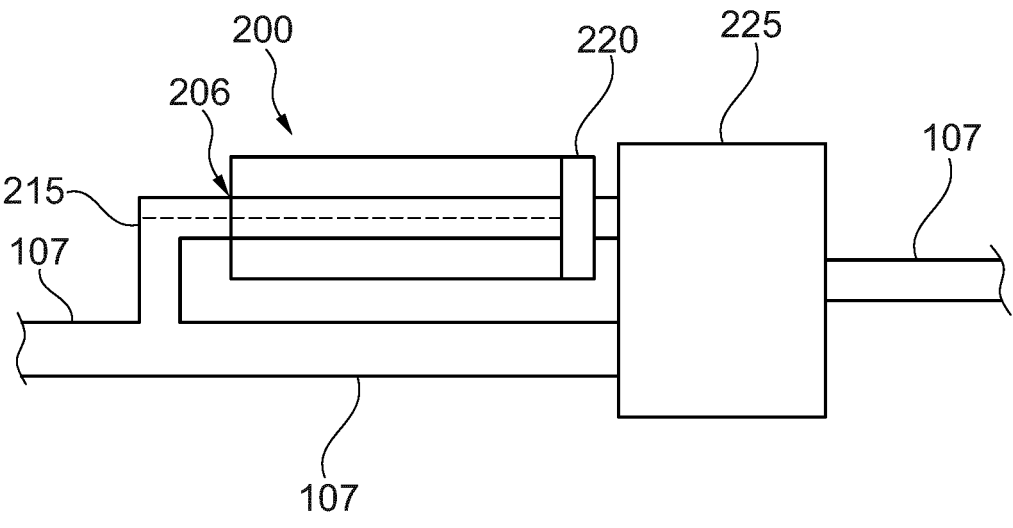
FIG. 4B shows a schematic view of an arrangement of a water treatment apparatus according to embodiments described herein.

FIGS. 4A and 4B shows a schematic view of an arrangement of a ballast water treatment apparatus according to embodiments described herein. The mixing device 225 may be arranged adjacent to the plasma generation device 200. In particular, the mixing device may be arranged adjacent to the cooling fluid outlet and/or adjacent to the activated gas outlet. Between the mixing device and the plasma generation device a distribution device 220 may be arranged. In particular, the combining section may include the distribution device being configured to provide the cooling fluid to the activated gas. For example, the distribution device 220 may be connected to the plasma generation device. The distribution device may be configured to combine the activated gas with the cooling fluid from the cooling fluid outlet. The distribution device may be configured to facilitate the mixing of the cooling fluid and the activated gas to form an activated fluid product. The distribution device may include one or more nozzles for spraying the cooling fluid into the activated gas or for spraying the activated gas into the cooling fluid.

According to embodiments, the distribution device may include one or more nozzles to spray the cooling fluid into the activated gas. The active species may diffuse into the cooling fluid. Thus, an improved and gentle mixing of the active species and the cooling fluid may be achieved. As many of the activated species are not very stable and may decay on timescales of milliseconds and lower, it is important to very quickly dissolve the active species into the cooling fluid. As an example, when the cooling fluid is a liquid like e.g. de-ionized water and as the solubility in water is generally very high (e.g. for ozone >500 mg/l), relative high concentrations of active species in the cooling fluid can be achieved.

According to embodiments, the ballast water treatment apparatus may include a cooling fluid feed line 215. The cooling fluid feed line may provide the cooling fluid at the hollow body, particularly at the cooling fluid passage 206 provided by the first electrode, more particularly at the cooling fluid inlet. The cooling fluid may be guided through the plasma generation device, i.e. the first electrode and may be sprayed into the activated gas at the distribution device 220 at the end of the plasma generation device. The distribution device may combine the cooling fluid and the activated gas to generate an activated fluid product. The distribution device may be connected to the mixing device 225. The activated fluid product may be provided at the mixing device 225. The mixing device may be configured to mix the activated fluid product and the ballast water main stream. The ballast water transport line 107 may be connected to the mixing device to provide the ballast water main stream to the mixing device.

In embodiments, a Venturi mixer may be used as the mixing device 225 according to the present disclosure. Here mixing refers to the mixing of activated fluid product and the ballast water. As a non-limiting example, a Venturi mixer applicable to the present application is obtainable from Mazzei Injector Company, LLC, Bakersfield, Calif., US, for relatively low volume rates per hour. A mixing device working according to the same principle may be appropriately chosen for higher volume rates per hour of the passed-through ballast water according to the specific need. For example, volume rates per hour that the present application is applicable to can be greater than 100 m³/h, for example greater than 500 m³/h and about 1000 m³/h, but not limited thereto.

The activated gas may include, among others, ozone ($O_3$) as an active oxidant. The activated fluid product may be transported to the mixing device i.e. the Venturi mixer. Thereby, upon transportation of ballast water through the ballast water transport line 107 and the Venturi mixer, the Venturi mixer forms a "jet & mix" structure in which the activated fluid product is effectively mixed and distributed inside the ballast water stream.

According to embodiments and as shown in FIG. 4B, the cooling fluid feed line may be arranged with the ballast water transport line. In particular, the cooling fluid feed line may be in fluid connection with the ballast water transport line. Such arrangement allows for the transported ballast water to be used as a cooling fluid as described above. In embodiments, the cooling fluid may include treated or untreated ballast water.

According to embodiments described herein, intermediate spraying of a liquid, particularly of water, in the feed gas may be provided. Thus, the feed gas and/or activated gas may be cooled and humidity may be increased. This may also lead to an increase of hydroxyl (OH) or hydrogen peroxide ($H_2O_2$) in the feed gas and/or activated gas in the discharge. According to embodiments, the injection of other liquids that can also be used for cooling and at the same time for starting a certain chemical process in the plasma, may be provided.

Figure 5:
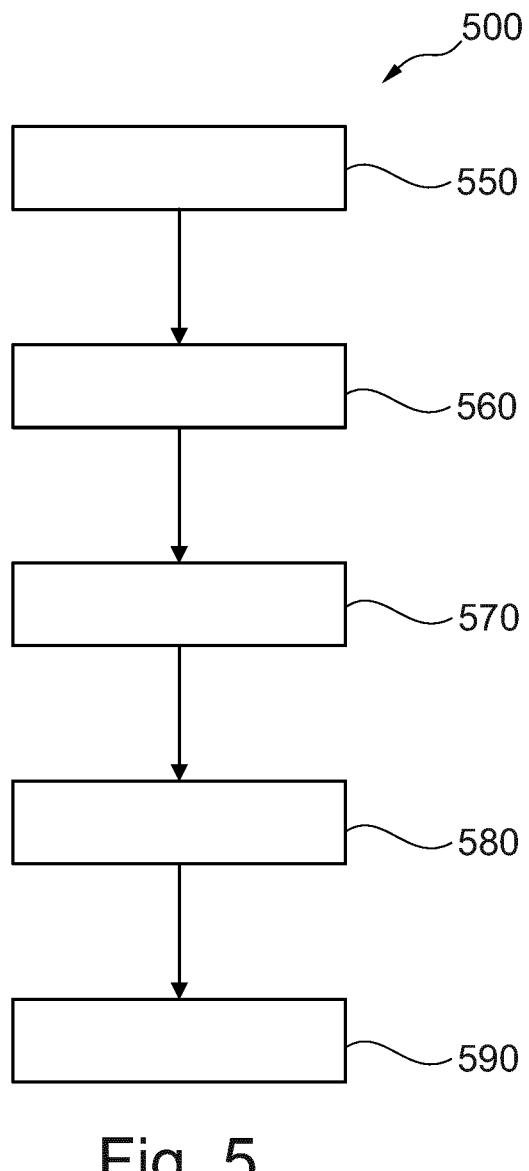
FIG. 5 shows a flow diagram of a method according to embodiments described herein.

FIG. 5 shows a flow diagram of a method according to embodiments described herein. The method for treatment of ballast water includes transporting 550 a ballast water main stream through a ballast water transport line, generating 560 an activated gas from a feed gas with a plasma generation device, the plasma generation device comprising a feed gas inlet, a first electrode 202 and a second electrode 204, for activating the feed gas by an electric discharge between the first electrode 202 and the second electrode 204 thereby generating the activated gas, cooling 570 the plasma generation device by feeding a cooling fluid passage with a cooling fluid, the cooling fluid passage having a cooling fluid inlet and a cooling fluid outlet, combining 580 the activated gas with the cooling fluid from the cooling fluid outlet 207 to generate an activated fluid product and mixing 590 the activated fluid product and the ballast water main stream.

According to embodiments, combining 580 the activated gas and the cooling fluid may further include spraying the cooling fluid into the activated gas. The method may further include treating the main stream of ballast water with the activated fluid product.

According to embodiments, treating the ballast water main stream may include disinfecting of the ballast water main stream e.g. by the use of the activated species generated by the plasma generation device. Additionally or alternatively, treating the ballast water main stream may include the treatment with UV radiation and/or chemical treatment.

According to embodiments, the method may further include providing the cooling fluid at a temperature in the range of −20° C. to 60° C., particularly in the range of 0° C. to 50° C. Thus, a proper cooling of the plasma generation device i.e. of at least one of the plasma, the feed gas and/or the activated gas may be ensured leading to a higher stability and less degradation of the active species generated. According to embodiments, the feed gas and/or the activated gas may be guided through the plasma generation device.

According to embodiments, the cooling fluid may be guided through the plasma radiation device. In particular, the cooling fluid may be guided through the hollow body, more particularly trough the cooling fluid passage. The cooling fluid may be guided through the plasma generation device with a pressure in the range of 0.1 bar to 1 bar. Additionally or alternatively, the cooling fluid may be guided through the cooling fluid passage at a flow velocity in the range of 1 ml/min to 200 ml/min, more particularly in the range of 50 ml/min to 100 ml/min.

The invention claimed is:

1. A water treatment apparatus, comprising:
a water transport line configured to transport a water main stream;
a plasma generation device configured to generate an activated gas from a feed gas; and
a mixing device;
the plasma generation device comprising:
a feed gas inlet for a feed gas;
a first electrode and a second electrode, for activating the feed gas by an electric discharge between the first electrode and the second electrode thereby generating the activated gas, the first electrode and the second electrode each being a cylinder electrode, the first electrode being disposed inside the second electrode;
a cooling fluid passage for cooling the plasma generation device, the cooling fluid passage having a cooling fluid inlet and a cooling fluid outlet, the cooling fluid passage being fed with a cooling fluid; and
a combining section connected to the cooling fluid outlet to combine the activated gas with the cooling fluid to generate an activated fluid product;
the mixing device being configured to mix the activated fluid product from the combining section and the water main stream from the water transport line;
wherein the mixing device includes a Venturi mixer;
wherein at least one of the first electrode or the second electrode comprises the cooling fluid passage.

2. The water treatment apparatus according to claim 1, wherein a plasma is generated between the first electrode and the second electrode by the electric discharge.

3. The water treatment apparatus according to claim 1, wherein the cooling fluid passage comprises at least one cooling fluid channel.

4. The water treatment apparatus according to claim 3, wherein the first electrode is an inner electrode and the second electrode is an external electrode, the at least one cooling fluid channel being arranged within the first electrode.

5. The water treatment apparatus according to claim 1, wherein the plasma generation device further comprises an activated gas outlet, and wherein the mixing device is arranged adjacent to the cooling fluid outlet and/or the mixing device is arranged adjacent to the activated gas outlet.

6. The water treatment apparatus according to claim 1, wherein the combining section comprises a distribution device, the distribution device being configured to provide the cooling fluid to the activated gas.

7. The water treatment apparatus according to claim 6, wherein the distribution device comprises one or more nozzles for spraying the cooling fluid into the activated gas or for spraying the activated gas into the cooling fluid.

8. The water treatment apparatus according to claim 1, wherein the plasma generation device is coaxially arranged in the water treatment apparatus.

9. The water treatment apparatus according to claim 3, wherein:

a surface of the second electrode is in contact with a dielectric, and the first electrode is free from contact with the dielectric; or the first electrode is in contact with the dielectric, and the surface of the second electrode is free from contact with the dielectric.

10. The water treatment apparatus according to claim 1, wherein the cooling fluid is a liquid.

11. The water treatment apparatus according to claim 1, wherein the cooling fluid comprises treated water or untreated water.

12. The water treatment apparatus according to claim 1, wherein the water treatment apparatus is a ballast water treatment apparatus for marine growth prevention of ballast water, and wherein the water transport line is a ballast water transport line configured to transport a ballast water main stream.

13. A method for treatment of water, the method comprising:

using a water treatment apparatus, which includes:
a water transport line,
a plasma generation device, which has:
a feed gas inlet for a feed gas, a first electrode and a second electrode, the first electrode and the second electrode each being a cylinder electrode, the first electrode being disposed inside the second electrode, a cooling fluid passage having a cooling fluid inlet and a cooling fluid outlet, wherein at least one of the first electrode or the second electrode comprises the cooling fluid passage, and a combining section connected to the cooling fluid outlet: and a mixing device, which includes a Venturi mixer, transporting a water main stream through the water transport line;

generating an activated gas from the feed gas with the plasma generation device, the first electrode and the second electrode of the plasma generation device being configured for activating the feed gas by an electric discharge between the first electrode and the second electrode thereby generating the activated gas;

cooling the plasma generation device by feeding the cooling fluid passage with a cooling fluid;

combining. via the combining section of the plasma generation device, the activated gas with the cooling fluid from the cooling fluid outlet to generate an activated fluid product; and mixing via the mixing device, the activated fluid product from the combining section and the water main stream from the water transport line.

14. The method according to claim 13, wherein combining the activated gas with the cooling fluid from the cooling fluid outlet further comprises:

spraying the cooling fluid into the activated gas with a distribution device.

15. The method according to claim 13, wherein the method further comprises:

providing the cooling fluid at a temperature in the range of −20° C. to 60° C., particularly in the range of 0° C. to 50° C.

16. The method according to claim 13, wherein the water being transported is ballast water.

17. The water treatment apparatus according to claim 2, wherein the plasma generated between the first electrode and the second electrode is a non-thermal plasma.

18. The water treatment apparatus according to claim 10, wherein the liquid is a water-based liquid.

19. The water treatment apparatus according to claim 1, wherein the cooling fluid passage is arranged in parallel to an axis of symmetry of the plasma generation device or in a helix conformation.

* * * * *